United States Patent [19]

Bolger

[11] 3,716,663

[45] Feb. 13, 1973

[54] COLOR TELEVISION RECORDER-REPRODUCER SYSTEM

[75] Inventor: Thomas V. Bolger, Pennsauken, N.J.

[73] Assignee: RCA Corporation

[22] Filed: Oct. 26, 1970

[21] Appl. No.: 84,173

Related U.S. Application Data

[63] Continuation of Ser. No. 659,218, Aug. 8, 1967, abandoned.

[30] Foreign Application Priority Data

May 22, 1967 Great Britain....................23,631/67

[52] U.S. Cl.......178/5.4 AC, 178/5.4 CD, 178/6.6 A

[51] Int. Cl.................................................H04n 9/48

[58] Field of Search.........178/6.6 A, 5.4 CD, 5.4 AC

[56] References Cited

UNITED STATES PATENTS

| | | | |
|---|---|---|---|
| 3,381,083 | 4/1968 | Jensen | 178/5.4 |
| 3,428,745 | 2/1969 | Coleman | 178/5.4 |

*Primary Examiner*—Robert L. Griffin
*Assistant Examiner*—Joseph A. Orsino, Jr.
*Attorney*—Edward J. Norton

[57] ABSTRACT

There is disclosed an automatic color amplitude and velocity error corrector for a color television recorder/reproducer system. Velocity errors which cause distortion in reproduced color video signals are corrected by combining two prior art error signals and converting the combined signal into a waveform which is more representative of the actual timing error introduced in the television signal by the record/playback process. The combined error signal is generated on a successive line-by-line basis and stored in a memory which is read at an interval during each television line to control a delay line in the recorder/reproducer color television signal playback path to afford compensation thereto. Color amplitude errors which produce saturation of the picture are compensated by comparing the level of the envelope of color bursts associated with a television line with a preset threshold signal. The resulting comparison signal is stored in a memory for each line and the memory is then accessed during the line in question to control equalization of the playback video signal by varying an attenuator located in the F.M. equalizer portion of the signal processing path. In this manner both color amplitude and velocity or phase errors in color television tape recorder/playback units are substantially reduced on a line-by-line basis.

8 Claims, 13 Drawing Figures

FIG. 3, FIG. 8, FIG. 11

INVENTOR
Thomas V. Bolger

BY Edward J. Norton
ATTORNEY

INVENTOR
Thomas V. Bolger

BY Edward J. Norton
ATTORNEY

INVENTOR
Thomas V. Bolger

BY Edward J. Norton
ATTORNEY

INVENTOR
Thomas V. Bolger
BY Edward J Norton
ATTORNEY

INVENTOR
Thomas V. Bolger
BY Edward J. Norton
ATTORNEY

INVENTOR
Thomas V. Bolger
BY Edward J. Norton
ATTORNEY

INVENTOR
Thomas V. Bolger
BY Edward J. Norton
ATTORNEY

INVENTOR
Thomas V. Bolger
BY Edward J Norton
ATTORNEY

INVENTOR
Thomas V. Bolger

BY Edward J. Norton
ATTORNEY

COLOR TELEVISION RECORDER-REPRODUCER SYSTEM

This is a continuation of my copending application Ser. No. 659,218, filed Aug. 8, 1967 and now abandoned.

BACKGROUND OF INVENTION

Television broadcasting networks and various professional societies have placed stringent requirements on color record and playback machines in order to provide the viewer with a high quality picture. Techniques attempting to meet these requirements have to provide a high degree of reliability with a minimum of maintainance and manual operation.

Present day television tape recorders have inherent problems that have to be solved in order to meet these stringent requirements. One such problem is a line-by-line chroma or color phase difference caused by heat-to-tape velocity errors and therefore commonly referred to as velocity error. In most modern color tape machines, especially those designed for studio operation, there is some form of automatic timing correction (ATC) equipment which tends to stabilize and correctly phase the color subcarrier only at the beginning of each television line. Even though such correction is provided, hue changes or changes in the various regions of the color spectrum's form or appearance can still occur across the line; as most of these modern day recorders do not correct for these line-by-line changes.

Another important problem which disturbs picture quality is referred to as chroma saturation or color amplitude error. This error is caused by differences in head-to-tape contact or incorrect playback equalization. Geometric errors in the head to tape scanning pattern, which occur in quadruplex-type rotary scan recorders, will cause saturation banding of the picture. This type of chroma or color amplitude variation occurs at a television line rate. Some recorders have a manual adjustment for chroma amplitude in the playback equalizer which controls only on a head-to-head basis (i.e., in a quadruplex recorder there are four heads located around the periphery of the tape scanning headwheel). Changes within an individual head band, however, are not corrected by this manual adjustment. This "head banding" error is perhaps the most typical error found in a color tape recorder/reproducer. Even when the unit contains a color correction circuit or a color amplitude timing control circuit (CATC), the error still persists. This error can be considered to be caused by two primary sources.

1. each head can have a different frequency response at the color subcarrier frequency, and 2. color or chrominance amplitude changes, through the head band, may vary as well.

The first case is further exaggerated in the event of the playback of previously spliced tapes. In this case the heads, having different frequency responses, may be playing back portions of a spliced tape which were made on different machines, under different conditions, further multiplying the errors. The second case is more typical for the high band or high frequency operation of the recorder, although these errors can and do occur at the low-band. These errors are mainly due to the fact that the head to tape contact changes from one edge of the tape to the other which in turn, causes a change in the frequency modulated or F.M. carrier to sideband ratio and this results in a changing color or chrominance. These errors, physically, can result from incompatibility problems between the headwheel panels used in recording and playback, or in a headwheel panel deficiency in one single unit, or even because of elasticity changes in a tape after being subjected to many playbacks. Other factors such as misalignment between the headwheel and the tape guide, improper equalization, and so on, also cause banding of the picture. Banding appears as horizontal bands of different color or hue within a television picture or portion thereof of one color. For instance if one were to record a complete red picture or a recorder, banding due to misalignment or other effects would cause the playback unit to provide a picture which contained horizontal bands of different shades of this primary color, as dark and lighter reds. In this manner the viewer would not see a pure red display but one with a plurality of horizontal bands of different hue and color.

The prior art, of course, has been concerned and plagued by such problems. There are manual adjustments, automatic color and chrominance band adjustments, automatic velocity or phase error circuits. As for the chrominance band adjusters, these do not solve the line-by-line color or chrominance errors. The manual techniques are insufficient as they depend completely on the skill and discretion of the operator.

The errors described above and the apparatus which cause them will present themselves in most modern day television systems. Even in such systems as PAL and SECAM, these errors exist in spite of certain precautions taken therein in signal processing. For instance, in the case of a recorder playing back a PAL tape, velocity error which would appear in the tape as a hue shift will be converted in the PAL demodulation process into an amplitude error across the head band, This will add to the original amplitude error which normally exists under the playback conditions. Now in such a system while each of these two factors may be negligible, if they are present independently, the combination of both errors can have a serious visible effect on the picture quality. In any case, in any system, the more that the tapes will be interchanged, copied and spliced, the more it becomes necessary to provide means for automatically correcting these errors.

It is therefore an object of the present invention to provide an improved television tape recorder/reproducer which substantially reduces color amplitude errors.

It is another object to provide an automatic color correction circuit for a video recorder/reproducer which operates on a line-by-line basis.

Still a further object is to provide a recording/reproducing system in which errors introduced in the reproduced signal due to changes in velocity between the tape and the playback means are substantially eliminated.

A further object is to provide an improved recorder-reproducer in which color amplitude and velocity errors in a color signal are substantially reduced during playback.

Still a further object is to provide an automatic color amplitude and velocity error correction circuit for a video tape recorder.

BRIEF DESCRIPTION OF INVENTION

These and other objects of the present invention are accomplished in one embodiment of this system by automatically correcting velocity and color amplitude errors in a reproduced color television signal on a line-by-line basis. A portion of the system referred to as the velocity error corrector utilizes two time correctors which exist in most modern day recorders. One time corrector is referred to as a monochrome automatic time corrector (MATC) and the other as a color automatic time corrector (CATC). The two error signals from these time correctors are used in the velocity error corrector to indicate the error existing at the beginning of each television line. However, in modern transports these error signals hold the same value for a complete line duration or until the beginning of the next horizontal line where timing errors are measured again. The color or chrominance velocity error correction portion of this invention is coupled to both the MATC and the CATC correctors. It measures the difference in the timing error from line-to-line in succession and generates a ramp voltage which is proportional to these differences. This ramp voltage is then added to the original MATC timing error signal to provide an error signal which causes a continuous correction across a television line rather than the one which is presently used and is discontinuous. In one embodiment of the invention, the velocity corrector sums the MATC and CATC error signals in a linear summing amplifier. The output of the summing amplifier charges a capacitor which is coupled to a drive amplifier. Signals, synchronized to tape horizontal, are generated within a digital logic circuit to enable the drive amplifier during the time the capacitor is charged to a potential representing the difference in velocity error between successive lines. The digital logic circuitry then addresses a 16-by-four matrix memory containing 64 bits or 64 unique locations. Each storage element used at a location may be a capacitor although cores or other storage elements could be used as well. The bit capacity of the memory corresponds to the number of compensations made during one headwheel revolution in a quadruplex system, which represents four video tracks, which in turn represents approximately 64 television lines. Hence, for line-by-line compensation one revolution of the headwheel corresponds to about 64 bits.

The matrix memory has a separate address for each line in the four tape tracks where it stores the error signal for that line. This stored signal is retrieved during a synchronized read cycle which connects the memory storage element associated with the line to a read amplifier, where it is then amplified and coupled to an integrating circuit which operates on the error signal. The integrator forms the linear ramp function, and this is added to the original MATC error signal by the operation of a summing amplifier. The summed signal is now fed to the MATC unit, where it is used to control a delay line, for example, in the MATC circuit to compensate the video signal for velocity error on a successive line-by-line basis.

Color amplitude errors are corrected in the system by sampling the color bursts in a sample/hold circuit. The color bursts are available at the output of the FM demodulator which exists in most modern day recorders. The amplitude of these bursts are compared in a level comparator to a reference or threshold signal. The output of the comparator provides an error voltage or control voltage which is coupled to the FM or frequency modulation equalization circuit in the playback signal's path, to change equalization so as to affect the color capabilities of the system. Color amplitude correction is accomplished in one embodiment by envelope detecting the color bursts and applying the envelope detected signal to a comparator where the signal is compared to a preset threshold level. The output of the comparator represents the color amplitude error in a particular television line. The error signal is stored within a memory having a plurality of capacitors. The information bus of the memory is coupled to a memory drive amplifier. The memory is also a 16-by-four matrix memory with 64 locations and can be accessed for any particular line. The output of the comparator as amplified by the drive amplifier is placed across the capacitor or other storage element in the memory representing the television line of concern. During a read cycle, the error signal is retrieved from the memory, amplified sampled and fed to attenuator drivers which vary a voltage variable attenuator circuit in the FM equalization circuit. This action compensates equalization according to the error signal stored in the memory for the television line of concern. In both correctors the memory storage elements information is continuously updated for each headwheel revolution and hence for each television line.

DETAILED DESCRIPTION

Figure 1:
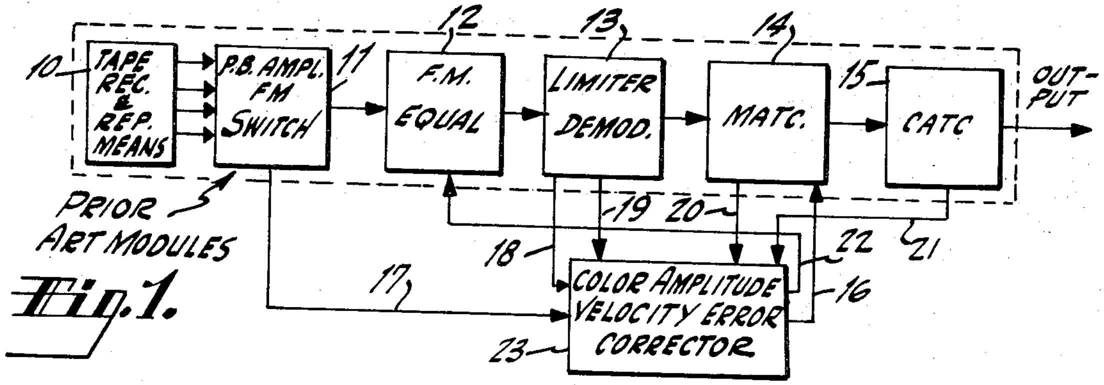
FIG. 1 is a block diagram showing the interconnection of the color amplitude and velocity error corrector of this invention with the circuitry of a modern day video recorder.

If reference is made to FIG. 1, there is shown a block diagram of a television magnetic tape recorder/reproducer including a color amplitude and velocity error automatic correction system 23 according to this invention. Numeral 10 refers to the magnetic tape recording and reproducing mans which exists in a modern day recorder/reproducer. Block 10 contains the playback head assembly of a typical rotary transverse recorder, sometimes referred to as a quadruplex recorder. In such a recording/reproducing system for television signals there are four magnetic heads which are mounted around the periphery of a headwheel, and which are spaced approximately 90° apart. The headwheel assembly is rotated by means of a servoed headwheel motor so that the heads record and play back transverse tracks on the video tape. Each transverse track produced on a magnetic tape as used in a quadruplex recorder represents the recording or reproducing path across the tape of a single head. Each track on such a tape represents about 16 television lines. There are 16 tracks for each television field, and hence 32 tracks on a video tape represent one frame which is recorded on the tape by eight transverse tracks for each individual head or eight revolutions of the headwheel. For a further discussion of the operation and exact nature of the signals recorded on such a tape, reference is made to U.S. Pat. No. 3,141,065 issued on July 14, 1964 entitled "Servo System" by A. C. Luther, Jr., et al. and to the literature. For example, reference is made to a book entitled "Video Tape Recording" by Julian Berstein, 1960, Rider Publisher Inc., New York.

The playback heads within block 10 are coupled to a playback amplifier and FM switching circuitry designated as block 11 and entitled P.B. AMP, F.M. SWITCH. One function of the playback amplifiers and FM switching circuitry contained in block 11 is to combine the four separate signals from the four magnetic heads into one continuous television signal. This is accomplished by taking, for example, the signals from heads 1 and 3 and combining them in a 4 × 2 diode switch to form a single signal having the information content reproduced by heads 1 and 3. The signals present on playback heads 2 and 4 are combined in a like manner, also by the use of a 4 × 2 diode switch. The outputs of the 4 × 2 diode switches are then coupled to a 2 × 1 switch which takes the signals representing the information content derived from heads 1 and 3 and from heads 2 and 4 and combines them into a single continuous video signal. In some recorders, presently in use, the combination is afforded by a single 4 × 1 switch which then takes the outputs from the respective heads and switches them sequentially to also form a continuous video signal at its output. The continuous signal is then amplified within block 11 to a desired value and coupled to a FM equalizer circuit 12. The function of the equalizer 12 in a video recorder is to provide amplitude or phase corrections to the composite signal to compensate for various disturbances which might have been introduced during the recording or playback process. The output of the FM equilizer 12 is coupled to a limiter-demodulator circuit 13 which serves to shape the FM signal and then demodulate it to obtain video or other information recorded on the tape. The output of the limiter-demodulator 13 is coupled to a monochromatic automatic timing corrector circuit or MATC circuit 14. Before coupling to the MATC circuit 14, which is found in some conventional tape recorders, the continuous FM signal is therefore equalized, limited and demodulated and the resulting video signal amplitude deemphasized. The video signal is then passed to the MATC circuit 14 where time base stability is restored to help eliminate the adverse effects of certain geometric distortions and jitter. The video signal typically passes through a voltage variable delay line within the MATC circuit 14 and through additional amplifier circuits to the color automatic timing corrector circuit 15 or CATC 15. From the CATC which also typically includes a controlled delay line, the signal passes through a video processer, not shown, where the chroma or color is separated from the monochrome signal. The two signals are processed (clamped and blanked), a new burst is inserted, and then they are recombined. The signals then pass to a video output amplifier, not shown, where regenerated sync is added and which provides isolated outputs to the out-going lines. For the purposes of this invention, the output of the CATC 15 has been designated as video out. It should be understood, as described above, that the signal in most modern day recorders is further processed as taught in the prior art after being operated upon by the CATC 15. The blocks 10–15 that have been briefly described are present in most modern day recorders and represent the prior art components of such units.

The complete ATC unit, comprising the MATC 14 and CATC 15, performs the following functions. The demodulated video is coupled to a tape sync processor where tape vertical and horizontal are processed out and squared off by means of gating these signals with an internal reference generator to provide sync pulses with sharp leading and trailing edges. A processed tape horizontal sample pulse is compared in a phase detector to the local horizontal or a reference signal to produce an error signal which is used to control the delay of the MATC delay line and hence properly phase the video information. The output from the MATC delay line is coupled to a burst processor as is the processed tape vertical and horizontal signals. The burst processor filters out the color bursts from the signal, clamps them and determines their polarity or sense. These signals are coupled to a color error detector circuit which compares the processed color burst with a reference subcarrier signal and provides at its output a color automatic timing correction error signal or CATC error which controls the delay of another delay line in the CATC module 15 to phase the video information from the MATC 14 according to color content. The output of the CATC delay, as indicated above is coupled to the video processor. For a more detailed operation of the ATC system as encompassing the MATC 14 and CATC 15 modules see "TR-70 Television Tape Recorder-Description and Installations" published by the Radio Corporation of America 1B–31855, pages 24 to 26.

FIG. 1 shows the coupling of signals between the color amplitude and velocity error corrector circuit 23 of this invention and the above described prior art modules. Briefly, the color amplitude and velocity error circuit 23 is coupled to the P.B. amp F.M. switch circuit module 11 via cable 17. It is understood that cable 17 may, in practice, be a plurality of leads serving to couple more than one signal from the module 11. In this case the cable 17 couples the head switching information from the 4 × 2 and 2 × 1 diode switches as previously described. The 4 × 2 and 2 × 1 switching signals on cable 17 represent signals which are used to identify the one out of four heads that is instantaneously reproducing or scanning the video tape. The limiter demodulator 13 supplies the separated color burst signal to the corrector circuit 23 via cable 18, and the tape horizontal and vertical signals via cable 19. The corrector circuit 23 also receives the MATC and CATC error signals, previously described, from block MATC 14 and CATC 15 via cables 20 and 21, respectively. By operating with the MATC and CATC error signals, the unit or corrector 23 converts these zero order hold signals into a waveform which is more representative of the actual timing error which is introduced in the television picture by the record/playback process. The adequacy of the velocity correction afforded by the corrector circuit 23 depends on the accuracy of the time error measurements performed by the MATC module 14 and the CATC module 15; as well as the magnitude of instantaneous deviations of timing errors from the line-by-line average of these errors. Velocity errors, which cause intra-line timing or differential phase errors are substantially reduced by the action of the corrector circuit 23 which performs correction by adding linear ramps to the normal MATC signal. The ramps are representative of the average timing error differences between successive MATC steps. This signal generated by the corrector circuit 23 is coupled to the MATC module 14 via lead 16 to further control the delay of the MATC delay line.

Another function of the corrector circuit 23 is to correct for and minimize saturation errors which tend to distort true color representation of the television picture. This function is accomplished by the corrector circuit 23 by sampling and comparing the color bursts from the limiter demodulator 13 to a reference signal and controlling an attenuator in the F.M. or frequency modulated equalization circuit 12 via lead 22. In this respect the color amplitude correction portion of the corrector 23 is similar to an automatic volume control circuit, in that it attempts to maintain the color burst amplitude at a constant level. However, as will be seen, the method of burst gain control is quite different from conventional automatic volume control or A.V.C. loops. This is so because in this loop, gain control is accomplished by varying the F.M. equalization of the tape playback system. This variation of equalization results in a change of the sideband to carrier energy ratio of the color burst in the FM domain and results in demodulated burst level control. In this system burst levels are thresholded and averaged, on a line-by-line basis. Adequacy of color amplitude correction depends on the magnitude of the instantaneous burst level deviations from the line-by-line average and the ability of the burst level to represent the FM equalization requirements for all color or chrominance information.

Figure 2:
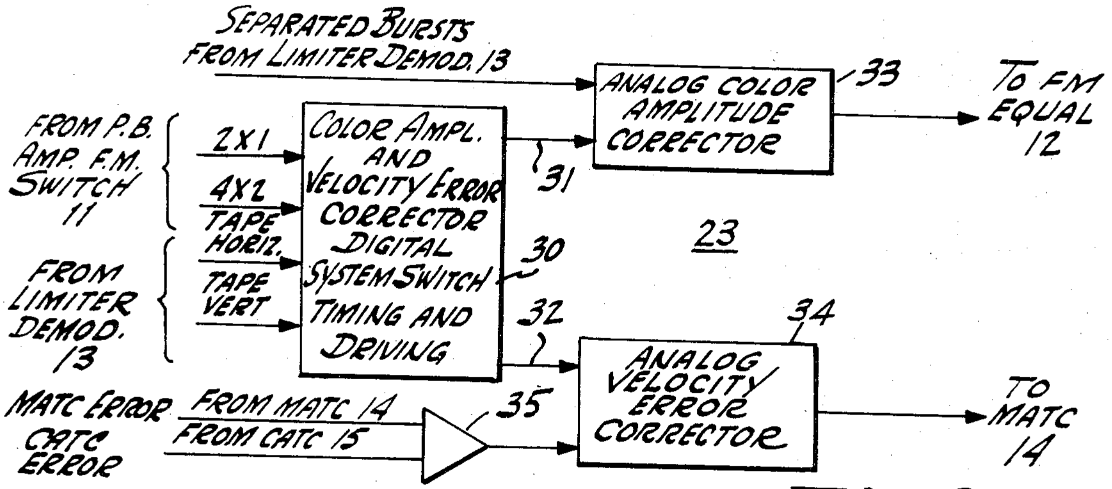
FIG. 2 is a detailed block diagram of a color amplitude and velocity error corrector system according to this invention.

If reference is made to FIG. 2, the corrector circuit 23 of FIG. 1 is shown in greater detail to enable one to obtain a clearer understanding of the digital and analog functions performed by the corrector circuit 23. Numeral 30 references the digital portion of the color amplitude and velocity error corrector with the corrector's system switches, timing logic and drive circuits. The digital portion 30 of the corrector 23 receives and processes the 2 × 1 and 4 × 2 switching pulses from the P.B. amp., FM switch module 11 of FIG. 1. These signals are decoded in the digital portion 30 to provide gating signals which identify playback head switching, or which of the four heads is actually scanning the tape. The tape horizontal signal from the limiter demodulator 13 triggers a counter in digital block 30 and is further used for gating purposes, so that all pulses sent to the analog portions of the corrector system are generated in the digital circuit 30 at the tape horizontal rate. The timing controls generated within block 30 are coupled to the analog color amplitude corrector 33 via cable 31. The other input to the analog color amplitude corrector portion 33 of the corrector 23 is the separated color bursts from the limiter demodulator 13 of FIG. 1. Again the broad function of the color or chrominance amplitude corrector 33 is to sample the color bursts, compare them to a reference to produce an error signal and to control the FM equalization of the playback signal with this error signal. The variation of equalization causes a change of the sideband to carrier energy of the burst in the FM domain and results in demodulated burst level control. Instantaneous burst levels are thresholded and averaged on a line-by-line basis. The output from the analog color amplitude corrector 33 is coupled to the attenautor of the FM equalizer 12 of FIG. 1.

The controls and timing for the analog velocity error corrector circuit 34 are coupled from the digital circuitry 30 via cable 32. Another input to the analog velocity error corrector 34 is from a combining circuit 35 which combines the error signals from the MATC 14 and CATC 15 of FIG. 1. This combined or composite signal serves to cancel out the effects of jitter which may be present on both error signals, especially on the MATC error signal. This combined signal is less susceptible to fluctuations, jitter and noise because of the cancelling effect due to the combination of the two signals as will be explained subsequently. The combined MATC error signal and the CATC error signal provides a composite error signal which indicates the error at the beginning of each television horizontal line. However, as indicated above, these signals (MATC and CATC) hold the same value for a complete line duration or until the beginning of the next horizontal line where timing errors are again measured. The velocity error corrector 34 measures the difference in timing error from line-to-line and generates ramps whose amplitudes are proportional to these differences. The ramps are then added to the original MATC error signal resulting in a continuous correction across the line rather than one which resembles a staircase. This error signal from the output of the analog velocity error corrector 34 is coupled to the MATC 14 of FIG. 1 to control the phase or timing correction of its delay line.

Having considered the general aspects of the analog and color amplitude and velocity error correctors 33 and 34, it is now noted that the system has to provide line-by-line control in each of the correction mechanisms. In short, one must provide two types of correction for each line of a complete television frame.

(i.e., 525 lines for domestic standards, 625 for some foreign standards and so on.) Since such errors are mainly repetitive and are based on one headwheel revolution then four tracks of 16 lines each contain all expected errors and thus 64 lines will compensate for the 525 lines or the total frame.

Figure 3:
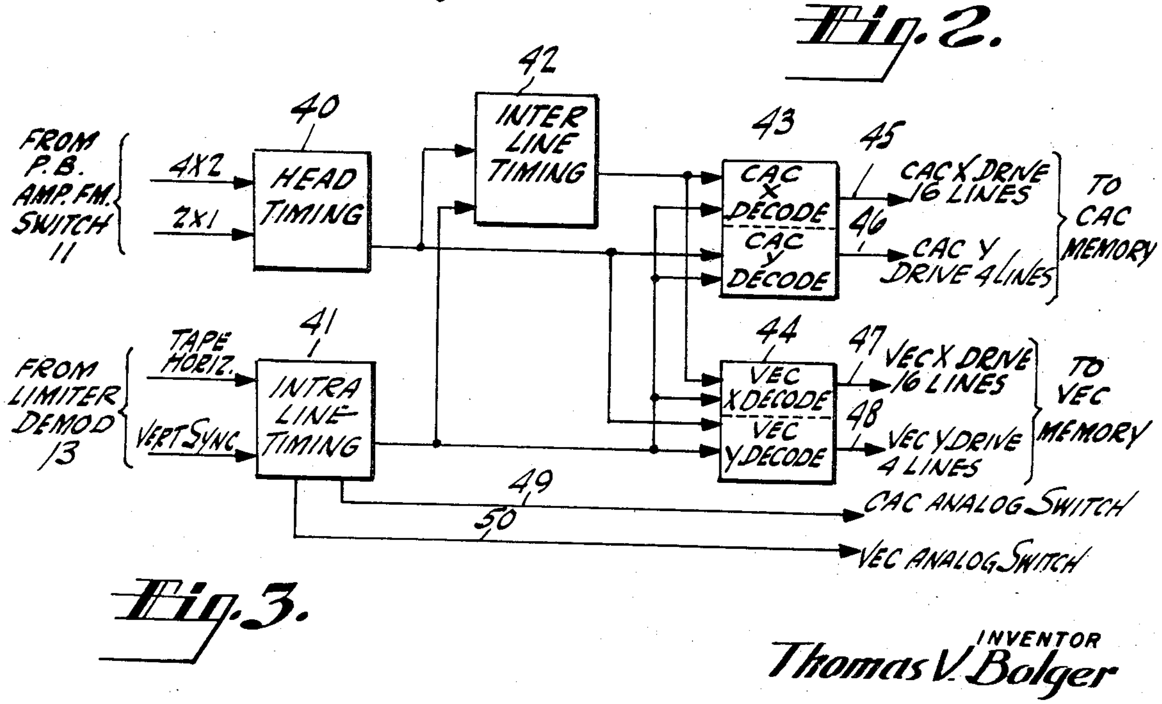
FIG. 3 is a block diagram of the digital timing section of the color amplitude and velocity error corrector.

If reference is made to FIG. 3 there is shown a more detailed block diagram of the color amplitude and velocity error corrector digital system switch timing and driving circuit 30 of FIG. 2. Four machine timing signals are obtained from the prior art color recorder/reproducer and used in the digital system 30. The 4 × 2 and 2 × 1 signals form a two wire logical identification of head switching of the quadruplex headwheel of the tape recorder. The 4 × 2 and 2 × 1 signals are decoded by the head timing section 40 to provide gating signals which identify playback head switching to determine which head is scanning the tape. Outputs from the head timing section 40 are coupled to an input of the interline timing unit 42, the decoder sections for color amplitude correction or the CAC X and Y Decode 43 and the decoder sections for velocity error correction or the VEC X and Y decode 44. Specifically the outputs of the head timing section 40 are coupled to the Y portions of the CAC and VEC Decoder modules 43 and 44. The interline timing section 42 contains a line-by-line binary, or other type, counter which is triggered at the tape horizontal rate and reset by the head timing circuit 40's output. For example, a four stage binary counter with suitable decoding gates can be used to generate 16 X drive signals. (See G. E. transistor manual 5th edition (1960) chapter on Basic Computer Circuits and Logic). This interline timing section 42 supplies the line decoding waveforms to the X sections of the X – Y decoders 43 and 44 and is capable of supplying 17 unique bits of information to these decoders as required by NTSC (National Television Standards Committee). For foreign standards the timing section 42 can be preset to supply either 15 or some other suitable number of bits to the X portions of the decode sections 43 and 44 to provide proper operation and compatibility with the different standards. The tape horizontal signal, of course, is a sync signal which is developed from the playback signal, and as such it identifies the beginning of each television line. This signal also operates the intraline timing section 41 of the digital system. All pulses utilized by the analog portions of the color amplitude and velocity error corrector circuits 33 and 34 of FIG. 2 are generated in the timing section 41 and are at horizontal rate. Actually, as indicated in FIG. 3, triggers to the interline timing unit 42 are also provided by this section and, as noted above, are also at the tape horizontal rate. The vertical sync pulse is used in the intraline timing section 41 to inhibit memory storage in the amplitude color corrector during the vertical blanking interval since there are no color bursts in this interval.

In order to achieve line-by-line compensation for color amplitude and velocity control errors, the content of the television line has to be monitored in some fashion and a voltage proportional to the deviations and hence the errors therein has to be developed. In the case of NTSC standards (Domestic) a television picture is composed of 525 lines. Each picture or frame consists of two fields, a field being 262.5 lines. In a recorder/reproducer of the quadruplex type, 16 tracks correspond to four full revolutions of the headwheel which in turn correspond to one field. Thirty-two tracks then correspond to eight full revolutions of the headwheel or one television picture or frame. Due to the repetitive nature of these errors in order to compensate on a line-by-line basis each headwheel revolution is represented by 64 bits or levels. Since four transverse tracks which are made during one headwheel revolution correspond to about 16 lines for each head, then 32 tracks, or one T.V. frame, is approximately equal to 16 × 32 or 512 compensating bits for 525 lines. The number 512 is lower than 525 because of the fact that the last line of a head pass is not compared with the first line of the next head pass, as this comparison has no meaning for purposes of compensation. For in this case one would be comparing errors at the bottom of one head pass with those at the top of the next head pass, instead of comparing actual successive errors.

Both the color amplitude and velocity error analog circuits 33 and 34 of FIG. 2 each separately require 64 unique memory bits or locations. The decoder sections 43 and 44 supply the drive signals determining 64 memory locations to respective memories for the analog color amplitude corrector and the analog velocity error corrector 33 and 34 of FIG. 2. The memories are driven in a matrix fashion. That is, to access 64 discrete locations in each memory the decoder sections 43 and 44 supply 16 lines for an X access and four lines for a Y access. Therefore, FIG. 3 shows at the output of 43 two cables 45 and 46. Cable 45 consists of 16 separate lines, each one of which is a color amplitude correction X drive line or a CAC X drive line. Cable 46 consists of four lines, each a color amplitude correction Y drive line or a CAC Y drive line. These CAC X and Y lines are coupled to X and Y access terminals of a matrix memory having 64 memory elements. In a similar manner the output of the velocity error corrector decoder or VEC decoder 44 has a cable 47, which supplies 16 X velocity error correction leads to a velocity error corrector memory. These lines are referred to as the 16 VEC X drives. As in the case described above there are also four VEC Y drive lines coupled to the VEC memory via cable 48. Hence for each analog system's memory, there are four Y drives which operate at the head switching rate, and 16 X drives that operate at the horizontal rate or the television line rate. Cables 49 and 50 emanating from the intraline timing section 41 respectively carry signals for proper sequencing of the analog switches associated with the color amplitude correction memory circuitry and with the velocity error correction memory circuitry, respectively. The exact nature of these signals will be described in detail later on.

In addition to the general functions just outlined, the digital portion of the correction system must perform other logical operations as well. Logic is included therein to insure rapid recovery from dropouts of the synchronizing signals derived from the tape. Recognition of a 16 or 17 line interval is incorporated so that the occurence of a 17 line interval as in NTSC or a 16 line interval as in international standards may be random. Also, special gating functions are generated to insure elimination of non-essential transients.

Techniques for implementing logic to do this are known in the art.

Figure 4:
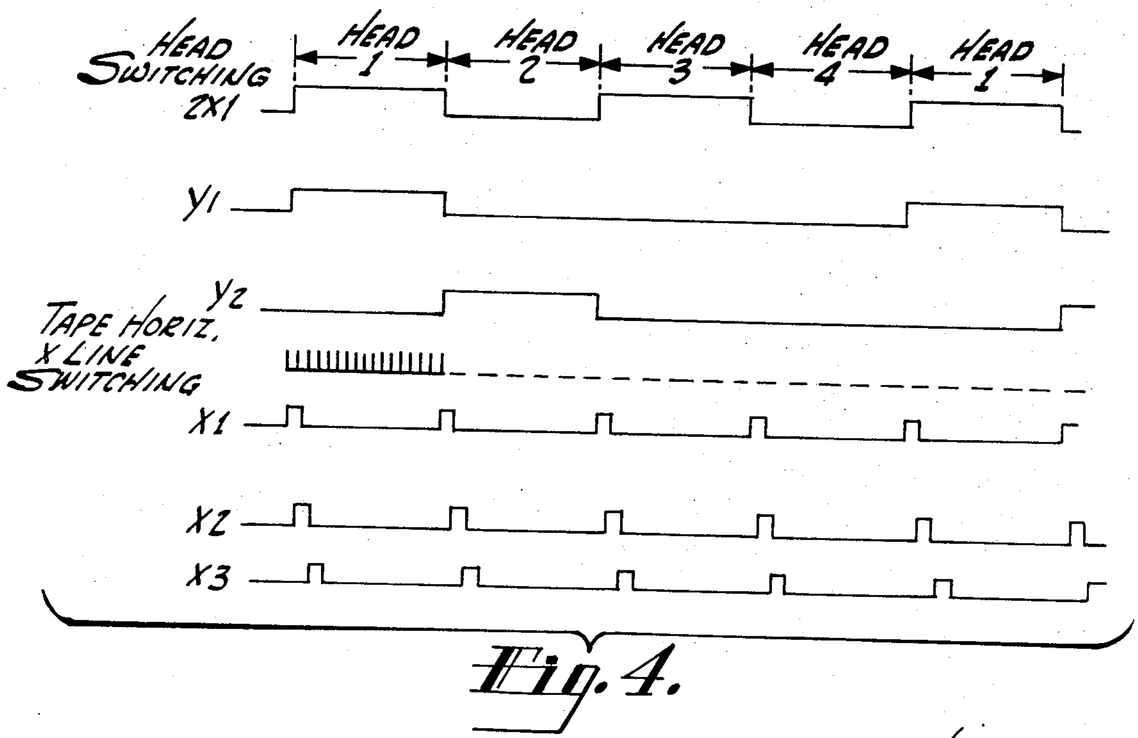
FIG. 4 is a series of timing diagrams used in explaining the operation of the structure of FIG. 3.

If reference is made to FIG. 4, there is shown a timing diagram indicating the relationships between representative X and Y drive signals for the color amplitude and velocity error corrector memories with respect to the head switching timing signal as generated by the modules of FIG. 3. The top signal entitled head switching 2 × 1, is indicative of the head that is scanning the tape. This 2 × 1 signal's transitions represent the sequence from head to head. The time duration during which the signal remains at a positive or negative level indicates when the respective head is scanning the tape. The Y drive signals are derived by the head timing section 40 of FIG. 3 by using a 4 × 2 signal from the recorder and a 2 × 1 signal. If one uses two wire logic, then two signals, each of which have two independent possible binary states (zero and one), can be combined to specify four discrete conditions (i.e., to indicate the time when each of the four heads is on the tape). This is shown for the case of head one and head two on the timing diagram of FIG. 4 by the waveforms $Y_1$ and $Y_2$. It is understood that there is a corresponding timing diagram for heads 3 and 4 as $Y_3$ and $Y_4$ which represent the time these heads are scanning the tape. Actually the 2 × 1 signal gives the exact sequence of head switching, while the 4 × 2 signal only has to be positive during the interval that a single one of the four heads is scanning the tape. The, as indicated above, by two wire logic one can develop signals proportional to the intervals that each head is scanning the tape.

Beneath the waveform $Y_2$, there is shown the tape horizontal signal used to provide the X line switching signal. This signal provides 16 pulses for each head scan or approximately 64 pulses for one headwheel revolution. The pulses occur at the tape horizontal rate and are used to trigger the counter of the interline timing section 42 of FIG. 3. This counter generates signals which are decoded by the respective X decoder portions of the decoders 43 and 44 of FIG. 3, to generate 16 X drives for both the color amplitude and velocity error memory circuits. There are shown in FIG. 4 three timing diagrams labelled $X_1$, $X_2$ and $X_3$. The pulses of these diagrams are at the horizontal rate and represent the interval that each head is scanning a specific line. Sixteen such signals are generated for each head pass, each following in sequence, as shown for $X_1$ and $X_3$, and each having a repetition period equal to the time occupied by 16 tape horizontal pulses.

Figure 5:
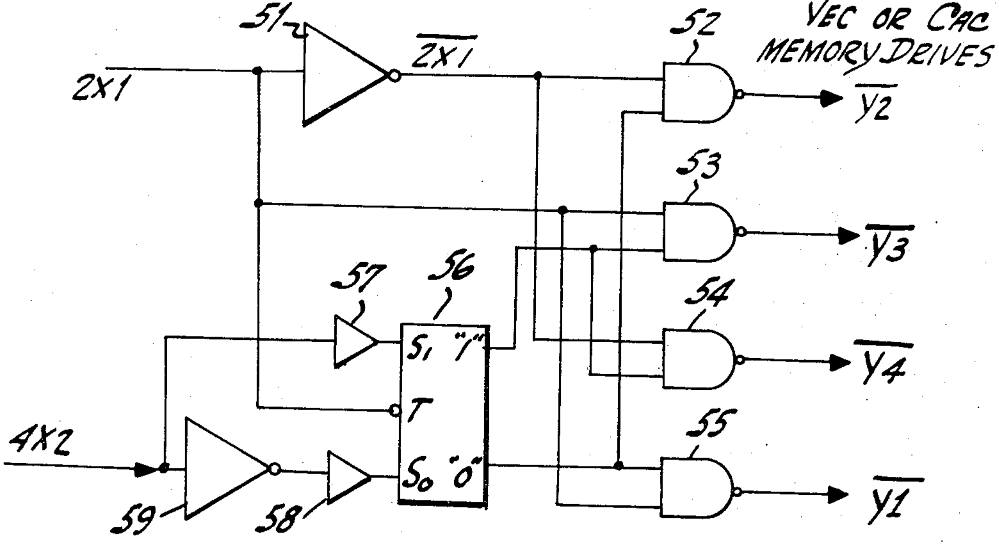
FIG. 5 is a schematic diagram of a representative decoder used in this invention.
Figures 6, 7:
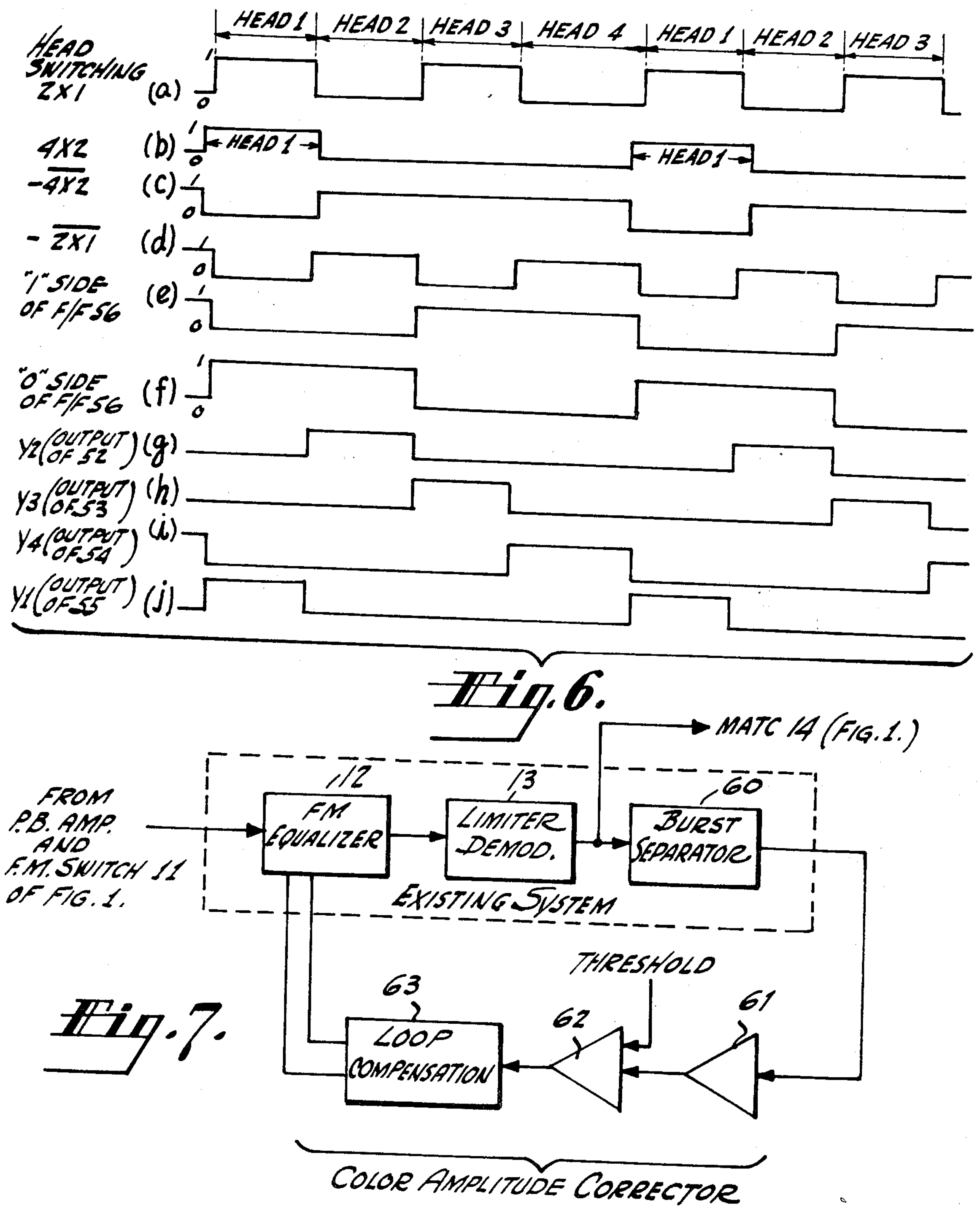
FIG. 6 is a series of timing diagrams used to explain the operation of FIG. 5.
FIG. 7 is a simplified block diagram showing a color amplitude corrector according to this invention.

FIG. 5 shows a typical decoder which can be used to generate the Y drive signals for either the CAC or VEC memory circuits of the corrector 23 of FIG. 1 and 2. If reference is made to FIG. 6 there are shown the pertinent waveshapes which appear at various output terminals of FIG. 5. Waveforms A and B of FIG. 6 show the head timing or switching signals obtained from the recorder/reproducer section. Waveform A is the timing waveshape from the 2 × 1 switch and waveform B is the timing waveshape from the 4 × 2 switch. The 4 × 2 switch timing is positive when head one is on the tape and the 2 × 1 signal indicates when each one of the four heads are on the tape. The 2 × 1 signal is coupled to inverter 51 of FIG. 5 which reverses its polarity. The output of inverter 51 is shown by waveform D which is labelled $\overline{2\times1}$. The 4 × 2 signal is coupled to and inverted by inverter 57 whose output is shown by waveform C which is labelled $\overline{4\times2}$. The 4 × 2 signal is also coupled to a series chain of the two inverters 59 and 58, and therefore the output of inverter 58 is the 4 × 2 signal as shown in waveform B of FIG. 6. The inverters 58 and 59 are shown to indicate that there may be buffering needed between the decoder circuitry and the recorder circuits to allow the recorder signals to trigger the logic modules utilized herein. The 2 × 1 signal is coupled directly to the trigger input T of a flip-flop 56. The steering signals for the flip-flop 56 are obtained from the output of inverters 57 and 58 which are respectively coupled to the "steer one" side or S1 and the "steer zero" side or $S_0$ of flip-flop 56; the logic relation being that the flip-flop 56 upon receiving a position transition at its trigger input will revert to the "1" or "0" state in accordance with whether S1 or $S_0$ is positive or "1." Assuming then that the one side of the flip-flop 56 is initially at logic level "1" or positive, then the output of the flip-flop at the "1" side will appear as that shown in waveform E. The output at the zero "0" side of the flip-flop 56 is shown by waveform F.

The "and" or "nand" gates 52–55 are coupled to the flip-flop 56 and the inverted and non-inverted 2 × 1 signals in the following manner.

| OUTPUT | GATE | HAS OUTPUT WHEN |
|---|---|---|
| $\overline{Y1}$ | 55 | 2 × 1 and "0" side F/F/56 are "1" |
| $\overline{Y2}$ | 52 | $\overline{2\times1}$ and "0" side of F/F/56 are positive or "1" |
| $\overline{Y3}$ | 53 | 2 × 1 and "1" side of F/F/56 are "1" |
| $\overline{Y4}$ | 54 | $\overline{2\times1}$ and "1" side of F/F/56 are "1" |

Therefore the outputs from "and" or "nand" gates 52 to 55 represent the inverse when heads one, two, three and four are scanning the tape and hence are the outputs labelled $\overline{Y1}$ to $\overline{Y4}$. To obtain the true signals all one has to do is to couple the outputs of the "nand" gates 52–55 through another inverter to generate Y1 to Y4. The outputs Y1 to Y4 after inverting the outputs of gates 52–55 are shown by waveforms G to J of FIG. 6 and represent the time each head is scanning the tape. The outputs $\overline{Y_1}$ to $\overline{Y4}$ can further be gated in response to the sync signals from the intraline timing unit 41 to provide the desired waveshapes, i.e., waveform J of FIG. 9.

FIG. 7 is a block diagram representation of the color amplitude corrector portion of this system on a single TV line basis. For the sake of clarity certain numerals are retained to represent portions of the system previously described. In this color amplitude corrector portion or CAC, the separated color burst signal is coupled from the burst separator 60 into an envelope detector circuit 61. The burst separator 60 may be any of the prior art circuits used for this purpose and, in fact, such a separator exists in most prior art color recorders. The envelope detector 61 detects the peak excursions of the color burst signal and produces a signal at its output corresponding to the amplitude of the envelope of the color burst for any particular line being played back at the moment. The envelope detector 61 may be a simple diode detector or other suitable device. For examples of envelope detectors which can be used see "Electronics Radio Engineering" by Frederick E. Terman, McGraw Hill (1955), chapter 16 entitled Detectors and Mixers, pages 547–572. The envelope detected burst at the output of detector 61 is coupled to a comparator circuit 62, which compares this signal with a threshold voltage. The output of the threshold comparator 62 is coupled to a loop compensation network 63, which serves to control the phase and amplitude of this signal in a manner to stabilize the loop against oscillations. For real time compensation of each line there would have to be at least 64 of these channels to provide proper tape playback. The present system synthesizes these 64 loops (approximately 60 loops required for international standards) by time sharing one channel of electronics with a 64 cell analog memory.

Figure 8:
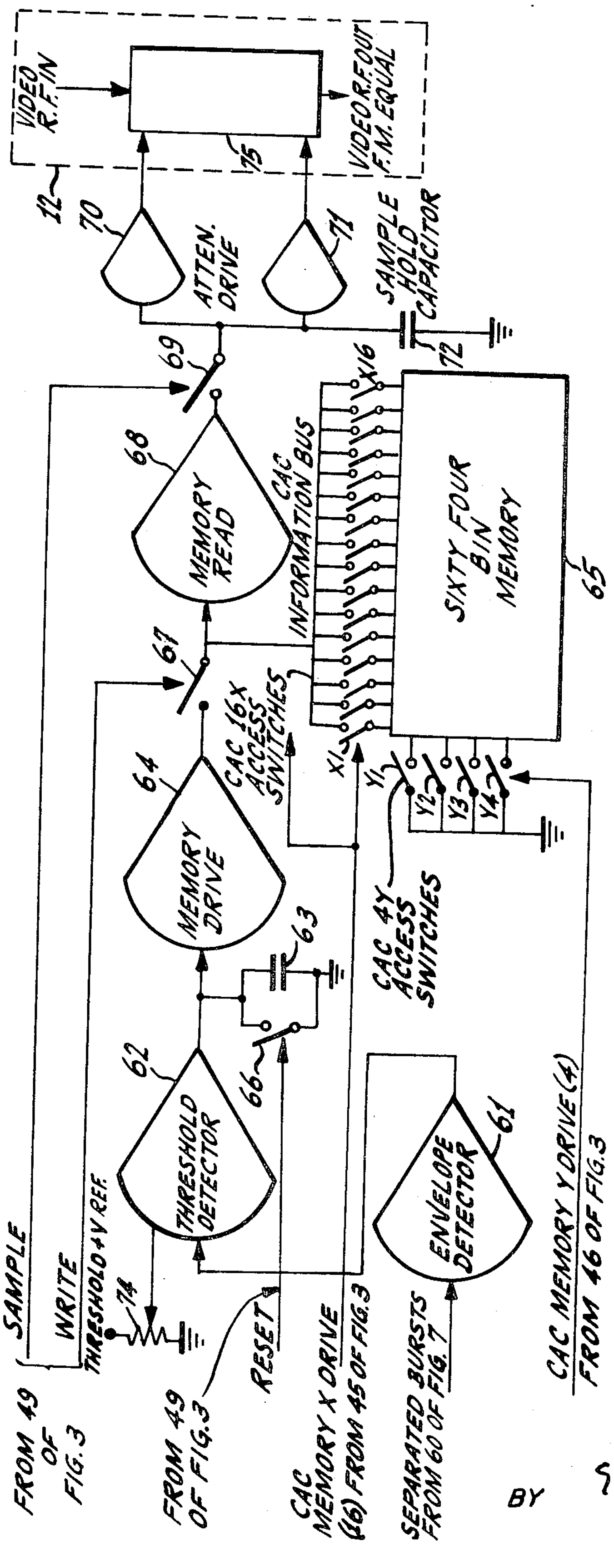
FIG. 8 is a more detailed partial block and partial schematic diagram of a color amplitude corrector.

If reference is made to FIG. 8, there is shown a functional diagram of the time shared color amplitude corrector. The separated bursts are coupled to the input of the envelope detector 61, where they are amplified, rectified and low pass filtered to produce a signal corresponding to the amplitude of their envelope. The output of envelope detector 61 is coupled to one input of a threshold detector 62. The other input of detector 62 is coupled to a threshold voltage level. This level is a function of the recorder/reproducer used, or of the tape being played back. This level can be set once and left alone for any particular unit or for any group of tapes made on a particular machine. The threshold level setting is derived from a potentiometer 74 returned to a voltage reference source designed as +Vref. The dynamic range of the potentiometer 74 with the source +Vref is chosen to be adjustable through the maximum anticipated errors, both mechanical and electrical, possible in a prior art recorder. This is determined by expected mechanical errors due to misalignment of the headwheel panel, tape stretch and so on. The errors discussed are "built in" and hence follow a function which is repetitive with each headwheel revolution as depending on the recording/reproducing apparatus. The envelope detected signal from 61 is compared with the threshold voltage in detector 62 which provides an output voltage according to the input signal until the input plus the threshold reaches a maximum level where it holds at this level. The signal at the output of detector 62 charges the capacitor 63, which stores the value of the detected, compared burst at the input to the memory drive amplifier 64. The capacitor 63 is coupled between ground or a point of reference potential and the input of the memory drive amplifier 64. The amplifier 64 preferably has a high input impedance to prevent charge "leak off" from the capacitor 63. Amplifier 64 could then be an operational amplifier, a complementary symmetry circuit or some other suitable configuration. There is also shown a switch 66 coupled across capacitor 63. The switch 66 may be a transistor or other device capable of going from high impedance to a low impedance state under the control of a suitable potential. Switch 66 is closed by the reset signal which will be described later on in conjunction with the timing diagrams shown in FIG. 9.

The output of the memory drive amplifier 64 is coupled to one terminal of a switch 67 whose state is under the control of a write signal; and as such switch 67 may also be a semiconductor device. The other terminal of switch 67 is coupled to the input of a memory read amplifier 68 and to an information bus connected to a group of 16 memory switches representing the X access switches of the 64 bin memory 65. The X access switches can also be semiconductor devices and are under control of the 16 CAC memory X drive signals described in conjunction with FIGS. 3 and 4. The memory 65 is also shown coupled to four "Y" access switches which are each under the control of a separate one of the four CAC memory Y drive signals. An example of a suitable switching arrangement will be described later on. The output of the memory read amplifier 68 is coupled to one terminal of a switch 69 whose other terminal is coupled to the inputs of two attenuator driving amplifiers 70 and 71. The inputs of these amplifiers 70 and 71 are also coupled to ground or a source of reference potential through a hold capacitor 72. The outputs of the attenuator drives 70 and 71 are coupled to an electronically variable attenuator circuit 75 in the FM equalizer 12.

Figure 9:
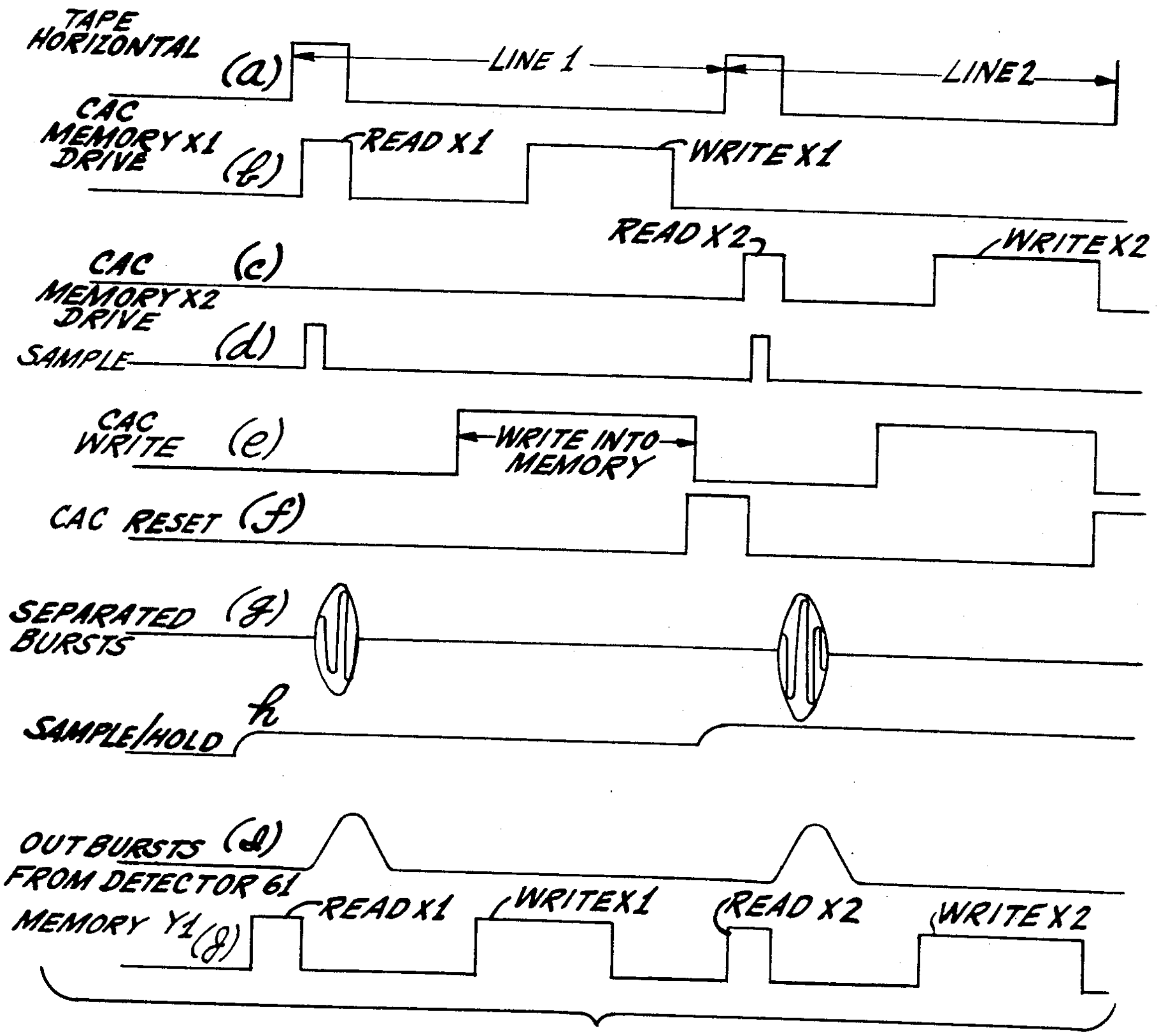
FIG. 9 is a series of detailed timing diagrams showing the relationship of various timing signals pertinent to the operation of the color amplitude corrector.

The memory 65 is arranged in a X–Y matrix and contains 64 elements capable of storing information, such as capacitors, cores, and so on. The 16 X access switches and 4 Y access switches are sufficient to address each element in the memory, thus avoiding 64 separate leads; which results in a great savings in decoding circuitry and number of wires. With reference to FIG. 9 and the timing diagrams A to J, the operation of the circuit of FIG. 8 will now be described. The separated bursts shown in waveform G are amplified, rectified and low pass filtered by detector 61 of FIG. 8 whose output produces the waveshape shown in I of FIG. 9. This signal energizes an input of the threshold detector 62, which compares it with the threshold voltage and places a charge on capacitor 63. The charge on capacitor 63 is then a function of the comparison between the threshold voltage and the color burst's amplitude, and hence represents the amount of color correction needed for the line in question. The voltage across capacitor 63, due to this charge, is amplified by the memory drive amplifier 64 and is placed into the memory 65 at a desired location.

Assume now that the recorder is scanning the tape by means of head number 1. If reference is made to waveform A of FIG. 9, this shows the timing of tape horizontal. The X1 drive signal for the memory 65 is in synchronism with tape horizontal as it is derived from the interline timing section 42 of FIG. 3. Basically this waveshape A is produced by a counter triggered at tape horizontal rate and by use of decode gates produces 16 separate pulses for 16 horizontal pulses. Such action is sometimes referred to as sequential stepping or sequential scanning. The X1 drive signal represents one bit of a two-bit address to access the memory for one television line. There are 16 memory locations for each tape track or 64 locations for four tracks which is equal to one headwheel revolution. The X1 drive signal of waveform B, also shows a second pulse spaced from the first pulse. The second pulse is a X write pulse and the first pulse of waveform B is referred to as a X read pulse. Due to the fact that tape horizontal occurs at the beginning of a television line, the read pulse of X1 drive now closes the first X access switch X1 (shown, for example in FIG. 8, on the left of the 64 bin memory 65).

At the same time the appropriate Y memory access switch or Y1 switch is activated by the memory Y1 drive waveshape shown in J of FIG. 9. It is noted that the waveshape of Y1 instead of being continuous for the duration of 16 lines (see waveform Y1 of FIG. 4) is gated with each of the 16 memory X drive signals, as X1 and X2. Hence the Y signals as shown in FIG. 4 as Y1 and Y2, actually contain the 16 X drive signals which are gated therein. This particular waveshape is used to prevent noise and other disturbances which may appear on the information bus of FIG. 8 from falsely activating the memory elements. However, all that is necessary if noise is not a problem, is to have one of the Y signals active for 16 separate X signals, which represent 16 TV lines or one video track. In any case when the respective X1 and Y1 signals go positive both the X1 switch and Y1 signals go positive both the X1 switch and Y1 switch are closed. This action connects one capacitor located at address (X1, Y1) between ground through the closure of switch Y1 and to the information bus through switch X1. Any charge on the memory capacitor (X1, Y1) is now amplified by the read amplifier 68 and during the sample pulse (shown in D of FIG. 9), which is approximately in the center of the read pulse of the memory X1 drive signal, is coupled to the inputs of the attenuator drivers 70 and 71.

A sample hold capacitor 72 is coupled to the input of attenuator drivers 70 and 71, which then stores a charge relating to the charge on the memory capacitor indicative of the difference between color bursts and the preset threshold voltage for the television line associated with the X1, Y1 storage element. The attenuator drivers 70 and 71 push-pull amplify the voltage and adjust the F.M. equalizer 12's attenuator 75 in a direction to control burst level. The time delay throughout the system is compensated for in the logic gating. The attenuator 75 of the equalizer 12 is electronically variable and its impedance is a function of the voltage applied to it by the attenuator drivers 70 and 71. For attenuator 75, one may use a varactor diode in series with a varistor or any other suitable device or devices capable of impedance variation with voltage. Such electronically variable attenuating circuits are known in the art and are not considered part of this invention. The drive signal from the attenuators 70 and 71 causes equalization to be applied to the burst in the video R.F. signal as well as all signals within that television line. The carrier to sideband ratio of the burst is thus controlled as well as the demodulated burst level. As indicated previously the 64 bin memory 65 contains, for example, 64 capacitors each separately designated by an X and Y address (i.e., X1, Y1 to X16, Y4). Each of these capacitors have the same capacitor value. The value is selected so that when a capacitor is connected in the circuit during the above described read or sample mode, this value provides loop compensation for the color amplitude "servo" or loop gain control. The memory capacitor as (X1, Y1) in combination with the sample hold capacitor 72, with the input and output impedances of the memory read amplifier 68 and the attenuator drivers 70 and 71, serve to provide phase and amplitude stabilization for the loop. This is necessary to avoid actual, marginal, or conditional stability and hence prevent system oscillations. Therefore each memory capacitor at an X, Y location serves the dual purpose of a storage element as well as a loop stabilizing component.

The write cycle, in which a desired compensating voltage is applied to a specified memory storage element of memory 65 is accomplished in the following manner. The separated burst of waveform G of FIG. 9 after being enveloped detected by detector 61 appears as shown in waveform I of FIG. 9. These bursts are thresholded by the detector 62 and charge capacitor 63. The charge on capacitor 63 is now amplified by the memory drive amplifier 64 which is connected to the information bus of memory 65 by closing of switch 67 activated by the write pulse shown in waveform E of FIG. 9. It is seen that this write pulse appears before and overlaps the respective write pulse portion of an X drive such as shown in waveforms B and C of FIG. 9. Hence the switch 67 is first closed coupling the memory drive amplifier 64 to the information bus. Following the closure of switch 67, an appropriate X switch is closed during the write pulse portion of its memory X drive signal (see FIG. 9, B and C). A particular Y switch is also closed due to the proper write waveshape appearing in the memory Y drive signal (see J of FIG. 9). This action connects a memory capacitor located at the accessed X, Y position between the information bus and ground. Any voltage at the output of drive amplifier 64, which represents the amplitude difference in color burst with the threshold is now placed across the (X,Y) memory capacitor. After the write pulse reverses polarity, the capacitor 63 is discharged by the reset waveshape F, whose positive transition closes switch 66 for rapid discharge of capacitor 63. The discharge of capacitor 63 allows it to be used again for the recording of the next line's error voltage to be placed into its designated (X,Y) memory location. The cycles described above occur sequentially for each of the 64 memory storage elements of memory 65 and hence 64 separate voltages are stored in memory 65 for each revolution of the headwheel or four tracks. In this manner 64 × 8 or 512 separate charges are placed on these memory capacitors to be used to compensate for color amplitude differences in a television picture or a television frame. Due to the repetitive nature of the errors the capacitors in the memory will charge to an error voltage which represents the amount of compensation necessary for each line after a suitable number of head revolutions.

Figure 10:
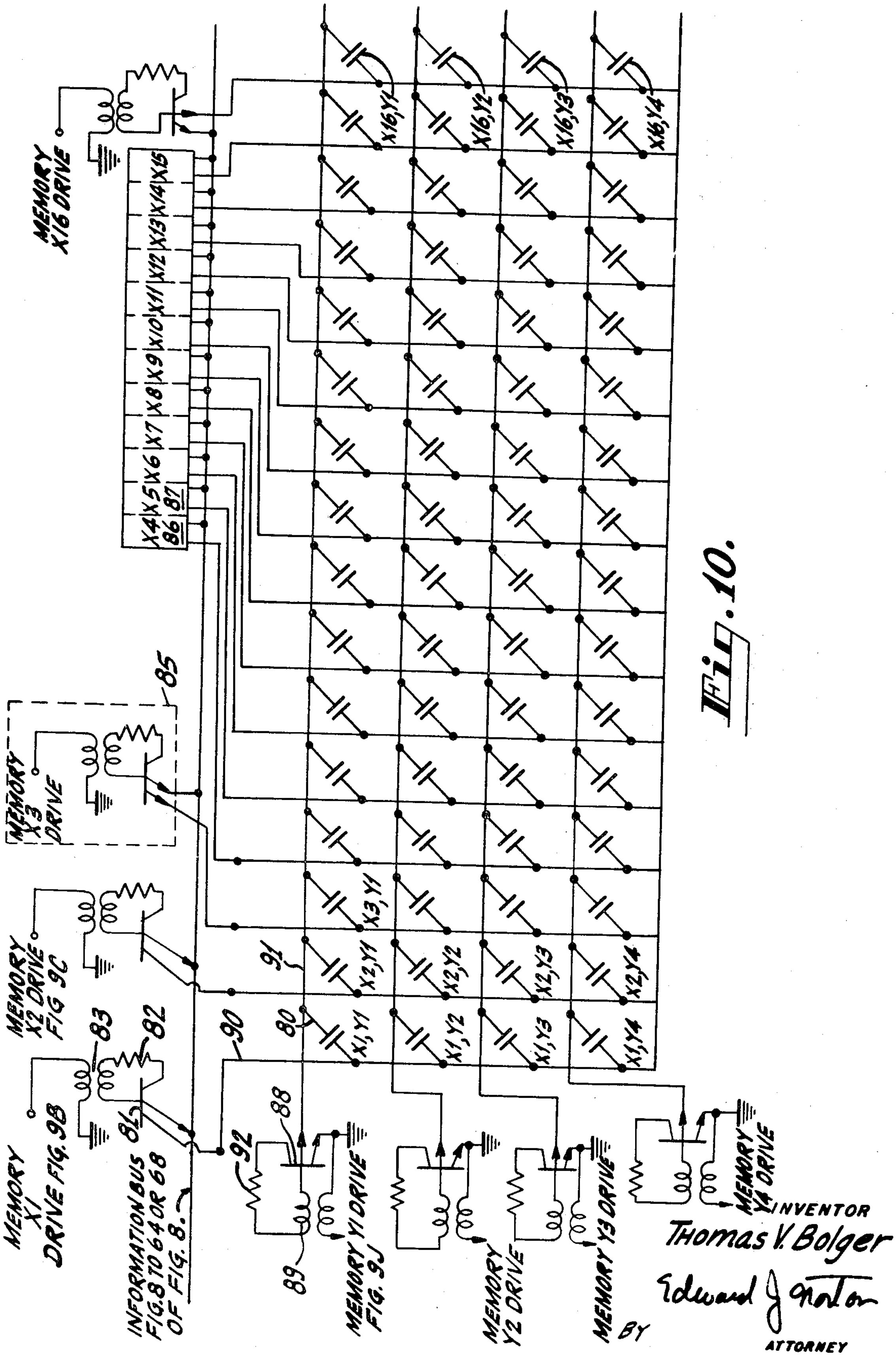
FIG. 10 is a partial schematic and partial block diagram showing a typical memory which can be used according to this invention.

If reference is made to FIG. 10, a schematic representation of a typical memory circuit which can be employed for that shown in FIG. 8, as the 64 bin memory 65, will be described. Numeral 80 represents a typical one of the 64 capacitors shown in the memory and as such has an address X1, Y1. Other capacitors are respectively labelled (X1, Y2) to (X1, Y4) and so on, showing actually what is meant by an X and Y memory element's address. Capacitor 80 has one terminal connected to the X1 drive bus 90 of the memory. The other terminal of capacitor 80 is connected to the Y1 drive bus 91. Hence the address location of memory capacitor 80 is (X1, Y1). Also coupled to the X1 drive bus 90 is an emitter electrode of a double emitter type switching transistor 81. The other emitter electrode of transistor 81 is coupled to the memory information bus shown in FIG. 8. In this manner the circuit can couple a memory capacitor to either the memory drive amplifier 64 via the actuation of switch 67 of FIG. 8, or to the memory read amplifier 68 of FIG. 8. The collector of transistor 81 is coupled to its base electrode through a series path comprising a resistor 82 and the secondary of transformer 83. The transformer 83 has a primary which is magnetically coupled to its secondary with one terminal of the primary returned to ground or a source of reference potential. The other terminal of the primary is controlled by the memory X1 drive waveshape shown in waveform B of FIG. 9, and generated within the module 43 of FIG. 3. The Y drive bus 91 is similarly coupled to one emitter electrode of another double emitter transistor 88. The other emitter of transistor 88 is coupled to a point of reference potential or ground. The collector of transistor 88 is coupled to its base through the series connection of the secondary winding of transformer 89 and resistor 92. The primary of transformer 89 has one terminal returned to ground and the other terminal is returned to the memory Y1 drive signal, whose waveshape is shown in J OF FIG. 9 and which is also generated within block 43 of FIG. 3.

Assume now that capacitor 80 is to be accessed, either for sampling the charge on the information bus or reading out its voltage to the bus. The memory X1 drive signal goes positive during the time slot reserved for the X1 drive, and at this time the Y1 memory drive, as described above, is also positive. This causes the information bus connected to one emitter of transistor 81 to be coupled to the memory X1 drive bus 90 by means of transistor 81 presenting a low impedance path between its dual emitter electrodes due to this positive potential between its base and emitter electrodes. Simultaneously, similar action occurs in transistor 88 because of the Y1 drive being positive at the same time. This connects the Y1 drive bus 91 to ground via a corresponding double emitter low impedance path in transistor 88. Hence capacitor 80 has one terminal at ground and one connected to the information bus. Any voltage on the bus, will be rapidly developed across capacitor 80 due to the low output impedance of the memory drive amplifier 64 of FIG. 8 as it is coupled to the information bus during the write cycle. During a read cycle any charge previously stored across capacitor 80 will be coupled through the memory read amplifier 68 and the sample switch 69 to the sample and hold capacitor 72 and hence to the inputs of attenuators 70 and 71 of FIG. 8. For clarity, circuits for the Y2, Y3 and Y4 memory drive buses are shown as are circuits for memory X2, X3 and X16 drives. It is understood that the blocks labelled X4–X15 contain the exact circuitry as shown within dashed box 85 for the memory X3 drive and are coupled to the information bus and their respective X drive buses of the memory in the manner described above for the memory X1 drive circuit.

Figure 11:
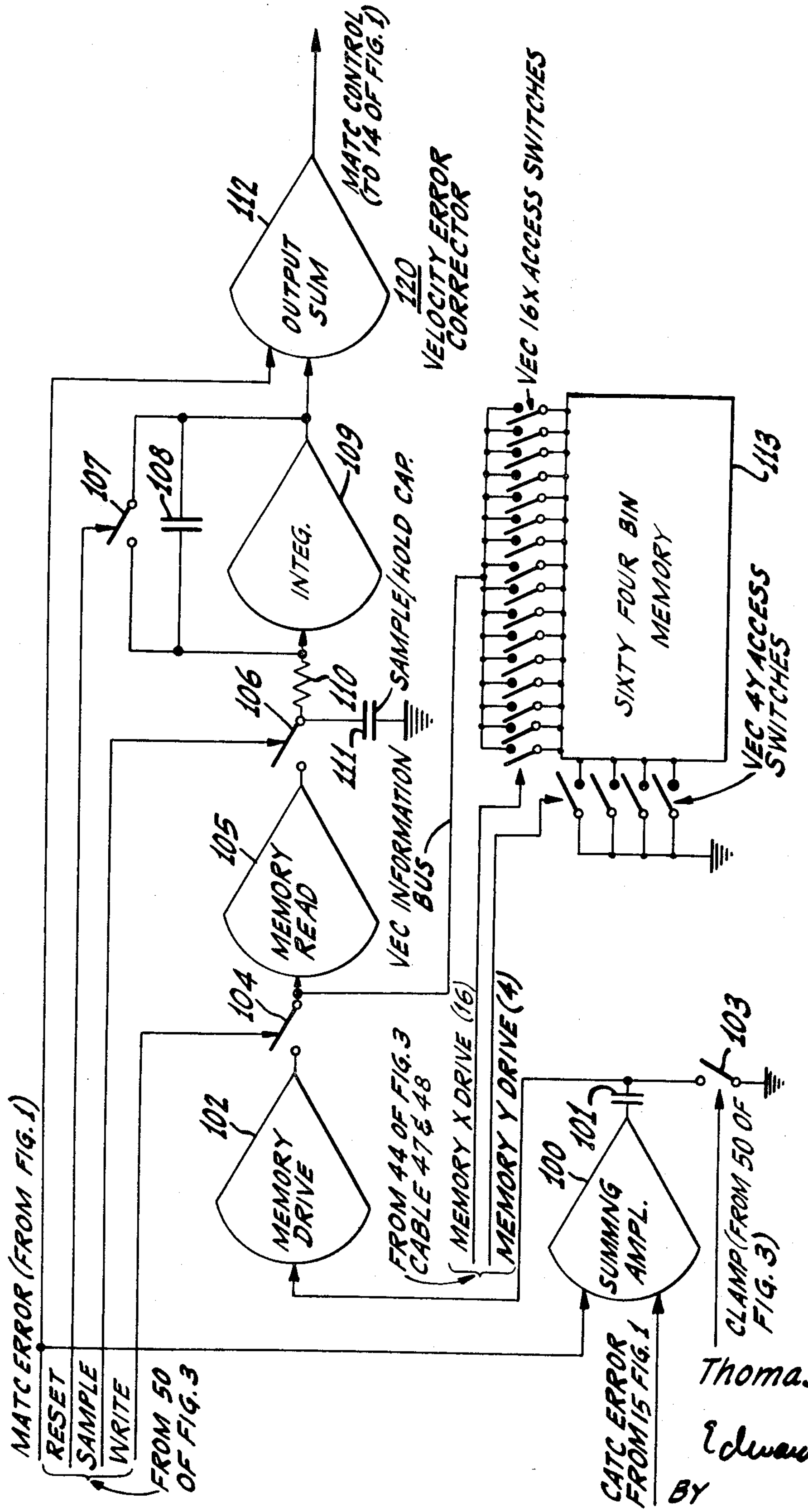
FIG. 11 is a partial block and schematic diagram of a velocity error corrector according to this invention.

If reference is now made to FIG. 11 and the timing diagrams of FIG. 12, the operation of the velocity error corrector or V.E.C. portion 120 of the system will be described. The VEC circuit 120 provides intraline hue correction to the automatic timing correction or ATC system existing in prior art recorders. The main purpose of the velocity error corrector circuit 120 is to substantially reduce phase errors which are accumulated within a television line. Essentially the velocity error corrector circuit 120 is an element in series with the monochrome automatic timing corrector's (MATC–14 of FIG. 1) error detector and its associated delay line driver. The zero hold order error signal provided by the prior art MATC circuit 14 of FIG. 1 is transformed into a waveshape that more exactly follows the instantaneous timing or phase errors of the tape playback signal. The circuit 120, to be described, is analogous to a first order hold system with the exception that the delay is eliminated. As in the first order hold system, the difference between successive values of the MATC and CATC combined error signals is measured and a ramp voltage waveshape corresponding to this difference is added to the original signal. The velocity error corrector circuit 120 develops this ramp on an average basis and is able to provide first order correction at the beginning of each television horizontal line. Because of this averaging, the velocity error corrector circuit 120 depends on the repetitive nature of these timing errors (i.e., MATC AND CATC) and in no ways accounts for instantaneous variations of these errors. This, however, is sufficient as such errors due to headwheel misorientation and related factors are, to a great extent, repetitive and such factors as neglecting instantaneous variations do not noticeably degrade the overall system performance.

Numeral 100 references a summing amplifier. The amplifier 100 receives both the MATC error signal generated by the MATC 14 of FIG. 1 and the CATC error signal from the CATC 15 of FIG. 1. These signals are scaled and added in amplifier 100, which may be an operational amplifier and, as such, each signal is fed to a separate resistor at the input to the amplifier 100. The scaling is a function of amplifier 100's gain. The scaling and adding of these MATC and CATC error signals in amplifier 100 is done to eliminate the noise and jitter effects which appear mainly on the MATC error signal. The reason that this accomplishes elimination of noise and jitter is because the MATC error circuit in the prior art machine is basically a timing corrector circuit operating with the tape horizontal signal and a reference signal which are compared in a phase error detector. The tape horizontal signal is a relatively wide band signal. The MATC circuit then being a time correction circuit, uses this wideband signal, and as such, is prone to noise and jitter within the band which in turn causes random timing errors and jitter at its output. Furthermore, the tape horizontal signal as originally recorded on the tape also has some jitter and noise due to the action of the original recording source, and this jitter also appears during playback. The video signal after being time corrected in the MATC unit, has a time delay on it due to these described disturbances caused by noise and jitter. This video signal is now sent to the CATC or color automatic timing corrector circuit 15 of FIG. 1. This circuit operates on color bursts and produces an error when comparing the color burst with a reference burst. The color bursts are narrow band signals and hence the CATC circuitry is more selective than its MATC counterpart. The CATC error circuit receives the MATC compensated video together with the disturbances caused by noise and jitter and corrects these delays on a narrow band basis. Thus the CATC provides a compensating error signal for noise and jitter produced by the MATC circuit and, therefore the combining of the two signals in the summing amplifier 100 effectively eliminates the noise and jitter on the MATC error signal. For examples of a suitable summing circuit for amplifier 100 see "RCA Linear Integrated Circuit Fundamentals" Technical Series IC-40 Copyright (1966) by Radio Corporation of America (Pgs. 66 and 231).

Figure 12:
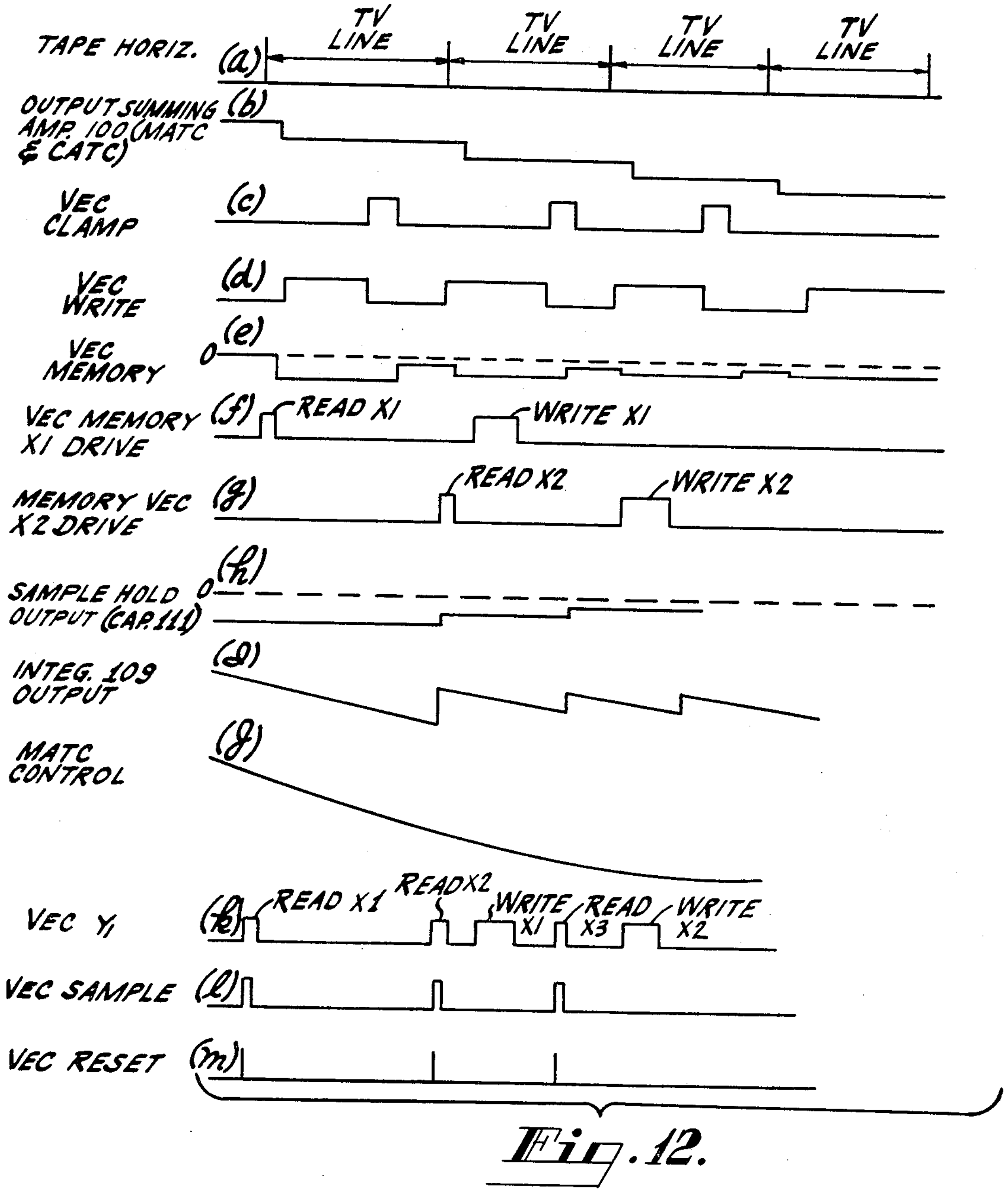
FIG. 12 is a series of timing diagrams showing the timing relations pertinent to the operation of the velocity error corrector of FIG. 11.

The waveshape output of the amplifier 100 is shown in waveform B of FIG. 12. Waveform A of FIG. 12 shows the timing relation of the tape horizontal signal to indicate again that timing within the velocity error corrector 120 is also in synchronism with the tape horizontal. In turn the tape horizontal signal represents the duration of a television line as explained previously. The resultant signal shown in B of FIG. 12 appears at the output of amplifier 100 which drives a capacitor 101. Capacitor 101 is clamped to ground by a VEC clamping signal shown in waveform C which activates the switch 103. Switch 103 may also be a semiconductor device under control of the VEC clamp waveform C of FIG. 12. The VEC clamping signal C of FIG. 12 is also generated at the television line rate of the recorder and hence appears in synchronism with the tape horizontal waveform A of FIG. 12. This clamping signal is generated within block 41 of FIG. 3 and sent to switch 103 over a lead within cable 50. The VEC clamp voltage's waveshape as shown in C of FIG. 12 can be generated in block 41 of FIG. 3 by triggering a monostable multivibrator from the trailing edge of the VEC write waveshape D of FIG. 12. Therefore the action of the clamping signal C of FIG. 12 occurs at the end of a television line interval but before either of the error signals, shown combined in waveform B of FIG. 12, change value. This timing allows capacitor 101 to charge to the total error level at the end of each line interval. Here it might be noted that the general appearance of the clamping waveshape (C of FIG. 12) is as shown with the exception that it is at a complete positive level during line one or the first television line in the frame. This is done because of the large switching transients occurring during line 1. Therefore by clamping capacitor 101 to zero volts or ground during this first line one avoids overloading the summing amplifier 100 which would cause a false charge to appear on capacitor 101 during the first line. During the next step or transition in the combined error voltage, which is indicated by a level change of waveshape B, the capacitor 101 is charged to a value equal to the sum or difference in voltage between the latter and former error levels. The waveshape across capacitor 101 appears as that shown in E of FIG. 12. This signal is then representative of error differences of successive horizontal intervals or line intervals and is amplified by the memory drive amplifier 102 which is coupled to the VEC memory information bus during the write pulse by the activation of switch 104. Switch 104 is activated during the positive pulses of the write waveshape shown in D of FIG. 12. Waveshapes F and G of FIG. 12 show two typical VEC memory X drive waveshapes. These are the same type of waveshapes as described in connection with the description of the color amplitude corrector circuit of FIG. 8. As in the case of the color amplitude corrector, the sixty four bin memory 113 for the velocity error corrector circuit is also arranged in an X–Y fashion as shown by FIG. 10. Every storage element (capacitor) is defined by its X–Y address and the memory is accessed in the identical manner described in FIG. 10. Hence the switch 104 is activated by the write signal and then the respective X and Y waveshapes obtained from unit 44 of FIG. 3 activate a respective X and Y switch addressing one storage element in the memory 113 to place a charge on it representative of the difference in error signal between successive lines. Each X–Y storage element of memory 113 can be doubly accessed during two unique switching times, one for reading out of the memory 113 and one for writing into the memory 113. As for the color amplitude corrector of FIG. 8, the read function time comes before the write time (see FIG. 12, waveshapes F and G). However, there is one distinction, the read cycle occurs at the beginning of the television line of interest, while write does not occur until after the error step transition of the next television line. (See FIG. 12 A, B, F and G). This is done because interest centers on the storage of error differences in memory 113 and hence one cannot read into memory 113 until the error voltage waveshape shown in FIG. 12, B has made a transition and therefore a line change has occurred. To be compatible with this implementation the VEC Y1 memory drive signal needed to activate the first Y bus of the 16-by-four memory 113 has the appearance shown in K of FIG. 12 for noise prevention purposes. Thus errors of line 1 will be read at the beginning of line 1 and will be written into the memory 113 after the error step during the line 2 interval. (See FIG. 12 B, F and G). Following this format, one more line interval than the number of XY storage bins or memory elements per head (16) is needed. In the case of domestic standards or NTSC 16 bins are used, but this 16th bin is written into only when a 17th line occurs within a head interval, while in international standards 15 bins are used where the 15th bin is written into when a 16th line occurs in a head pass. Since there is one less bin written into than the maximum number of lines, special consideration must be given to the read function so that a compensating function will be generated for each television line. This situation is handled by reading bin 15 for both line 15 and line 16 for international standards and by reading bin 16 for both line 16 and line 17 for NTSC.

As described above the voltage across capacitor 101 is then amplified by memory drive amplifier 102 and the voltage is transferred to a particular XY memory capacitor in memory 113 during the write cycle. This voltage represents differences in velocity errors between successive television lines. During a read cycle, the memory read amplifier 105 is connected to the VEC information bus and amplifies the signal thereon. The signal on the bus corresponds to the closing of one of the sixteen X access switches and one of the four Y access switches. The voltage across that X–Y memory capacitor is then coupled to the VEC information bus and amplified by the memory read amplifier 105. Amplifier 105 is coupled to a sample hold capacitor 111 on the activation of switch 106 by the VEC sample pulse, whose waveshape is shown in L of FIG. 12. The VEC sample pulse occurs approximately in the center of the respective VEC memory X drive read pulses (which are shown in FIG. 12 AS F and G). The signal from the Memory Read amplifier 105 is coupled to the sample and hold capacitor 111 which charges to a value determined by the magnitude of capacitor 111, the output impedance of the memory read amplifier 105 and the duration of the sample pulse determining the time of closure of switch 106. This produces a step voltage across capacitor 111 for each line as shown in FIG. 12 as H. The sample and hold capacitor 111 and a resistor 110 are coupled to the input of an integrating amplifier 109, which may be an operational amplifier and hence a capacitor 108 is shown coupled across the input and output terminals of amplifier 109 to indicate the integrating function. The integrating amplifier 109 is reset by discharging capacitor 108 via switch 107 during the sample interval by the VEC reset waveshape, shown in M of FIG. 12, activating switch 107. The output of the integrator 109 is the integrated amplified waveshape of the voltage across the sample and hold capacitor 111 and is shown in FIG. 12 as I, as a series of linear ramps whose amplitudes are controlled by the voltage level on the sample and hold capacitor 111. The combination of capacitor 111 and resistor 110 provide a time constant at the integrator 109's input so as to retain the voltage on capacitor 111 for the remainder of the television line of concern.

The linear ramp output from integrator 109 waveform I of FIG. 12 is coupled to one input terminal of an output summing amplifier 112. another input terminal is coupled to the source of the original MATC error signal from the MATC circuit 14 of FIG. 1. The summing amplifier 112 then combines the original MATC error signal from MATC 14 with the signal from the integrator 109 to provide a smooth, continuous signal, having no abrupt transitions at its output. This signal is designated as MATC control and is shown in waveform J of FIG. 12. This signal is coupled to the MATC 14 of FIG. 1 to control the delay line therein.

Since tape horizontal is used as a timing reference for all logic controls of both the color and velocity error correctors described above, the position of the error steps and the VEC and CAC memory write signals, relative to this reference defines the transient response of all circuits up to the write switches and hence adequate protection can be implemented with proper logic design.

Figure 13:
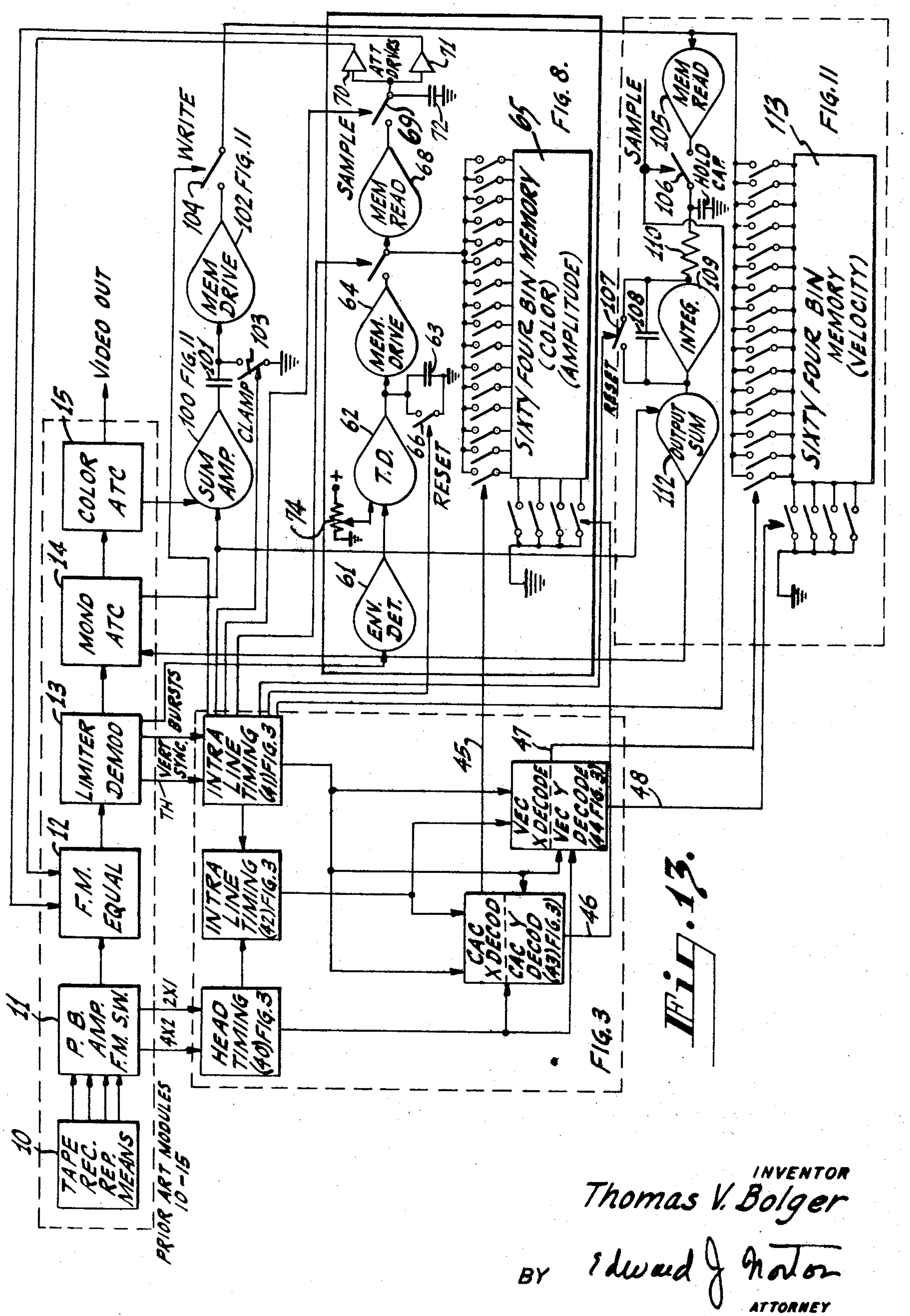
FIG. 13 is a detailed partial block and schematic diagram of a video recorder/reproducer having color amplitude and velocity error correction according to this invention.

If reference is made to FIG. 13 there is shown a partial block and schematic diagram of a prior art color tape unit having an automatic color amplitude and velocity error corrector circuit according to this invention. The respective sub-systems comprising the recorder have been blocked off and referenced according to the previous figures in which they have been shown.

In conjunction with the above description it is seen that the automatic velocity and error corrector circuitry depends heavily on digital functions and although the digital system operates in support of the analog circuitry, (FIG. 8 and 11) by setting the sequence time as well as the access drive signals to the X and Y switches, its design follows a digital format and its functions are implemented using typical logic elements, as flip-flops, "and" gates, and so on.

I claim:

1. In a color television recorder-reproducer having a rotating transducer for scanning in successive revolutions tracks recorded on a magnetic record medium, each of said tracks including a plurality of television lines, said recorder-reproducer having a signal processing path including equalization means for providing from the tracks of said record medium, a composite color television signal including a color burst in each of said lines, the improvement comprising; means for generating a threshold signal determined according to color amplitude errors normally present in said signal, means for comparing with said threshold signal the individual color burst of each of said plurality of lines scanned by said transducer to provide a corresponding plurality of error signal values proportional to the respective differences therebetween, memory means having individual storage elements corresponding in number to at least the plurality of said television lines scanned by said transducer in a given revolution thereof, said memory means including means for providing access to selected ones of said storage elements in accordance with separate ones of the lines of said tracks being scanned by said transducer, means coupling said access means to said comparing means for selectively accessing the corresponding ones of said storage elements for each line to store therein a signal determined by the respective one of said plurality of error signal values for that line, and further means coupled between said memory means and said signal processing path for selectively coupling said stored signals to vary said equalization for each line in accordance with said individual stored error signal values to provide color amplitude correction of said reproduced signal on a television line by television line basis.

2. The invention according to claim 1 wherein; said further means includes memory read amplifying means having an input coupled to said storage elements, sample and hold means coupled to the output of said memory read amplifying means, and drive means coupled between said sample and hold means and a voltage controlled variable attenuation means in said processing path through which said color television signal is processed.

3. The invention according to claim 2 wherein; said storage elements and said sample and hold means are capacitive means having a value when active providing gain and phase stabilization for correction of said color amplitude errors.

4. The apparatus according to claim 1 wherein; said memory means is a matrix memory having 64 capacitor storage elements arranged to be accessed in a rectangular configuration of 16 vertical busses and four horizontal busses.

5. The combination with a television recorder/reproducer system having a signal processing path for providing from a record medium a television signal consisting of a plurality of television lines for each television frame, each of said lines having a sync pulse and a color burst associated therewith, said system having in said processing path timing correction circuitry to provide error correction to said signal by comparing said bursts with a first reference signal and said sync pulses with a second reference signal to provide two error signals indicative of the timing errors in said reproduced television signal, including means for combining said two error signals and storing said composite error signal on a line-by-line basis and having means to apply said stored signal to said signal processing path to vary said path's response on a line-by-line basis to reduce the effects of said timing errors in said television lines, comprising; means for providing a threshold signal amplitude in the range of expected color amplitude errors, means for comparing the amplitude of the color burst of each of said lines with said threshold signal amplitude to produce a plurality of further error signals, each of said further error signals corresponding to respective ones of said comparisons, memory means, means for operating said memory means to individually store on a television line by television line basis each of said further error signals, and means responsive to said television signal and coupled to said memory means to compensate during each television line said amplitude errors according to said further error signals stored in said memory means as representing said amplitude errors in that television line, so that said amplitude errors are compensated in a continuous manner during each respective television line and on a television line-by-television line basis.

6. The combination with a color television recorder/reproducer having playback means for providing from a record medium a complete color television picture signal consisting of a plurality of television frames, each of said television frames having a plurality of television lines including a color burst signal associated therewith, of signal processing means including a single equalizer means having an input coupled to said playback means and a demodulation means coupled to the output of said equalizer means; and means forming a single closed loop feedback path about said signal processing means to substantially reduce the effects of color amplitude errors in each of said television lines; wherein said feedback path forming means comprises means coupled to an output of said demodulation means to compare said burst amplitude for each television line with a threshold value to provide a color amplitude error signal for each line of said television signal, memory means coupled to said comparing means for storing a color amplitude error signal for each television line, and means coupling said memory means and said equalizer means for accessing said memory means to vary the path response of said equalizer means to each of said television lines according to said stored color amplitude error signal for that line.

7. The invention according to claim 6 wherein said closed loop feedback path comprises a time shared color amplitude correction loop for each line of said television signal and wherein said loop includes capacitive means each one of which when active in said loop acts to simultaneously correct said color amplitude error and stabilize the operation of said loop.

8. In a quadruplex signal recorder-reproducer apparatus for reproducing a color television signal including color burst signal and having horizontal sync pulses, said television signal being recorded on a plurality of longitudinal spaced transverse tracks with a group of said tracks contain a number of television lines where each one of said tracks of said group is recorded and played back by a separate transducer located on the periphery of a headwheel, said transducers being controlled to record and reproduce said television signal by switching circuitry in said recorder and reproducer, a system for automatically compensating on a line by line basis color amplitude errors in said reproduced signal due to tolerance differences from a standard nominal value in said recording nd reproducing apparatus comprising, in combination; first means coupled to said switching circuitry for generating a group of separate signals each one of which is indicative of that transducer which is reproducing said color television signal, second means responsive to said horizontal sync pulses for providing a plurality of signals each separate one of which is indicative of a different television line being reproduced from one of said group of tracks, means for generating a threshold level indicative of tolerance differences in said reproducing apparatus with respect to said standard, comparing means responsive to said threshold and the color burst signal of each of said lines being reproduced for providing a control signal indicative of the respective differences therebetween, a memory having a storage element for each one of said television lines recorded on a group of said tracks, fifth means coupled to said memory and responsive to the output of said first and second mentioned means in a manner to access during a first interval between two successive ones of said sunc pulses any one of said storage elements associated with any one line in accordance with which separate one of said transducers is reproducing said signal and which television line is then being reproduced, to cause said access storage element to store said control signal for said line that is then being reproduced, a variable attenuator coupled in said signal processing path, further means coupled to said memory and responsive to said sync pulses to retrieve said control signal during an interval different from said first interval, and means responsive to said retrieved control signal and coupled to said attenuator to control said attenuator to provide in said signal processing path equalization which is variable from line to line in accordance with particular color amplitude errors which may exist in each of said television signal lines.

* * * * *